– Patented Aug. 6, 1940

2,210,133

UNITED STATES PATENT OFFICE 2,210,133

PROCESS FOR TREATING FRUIT

Jagan N. Sharma, Los Angeles, Calif., assignor to Food Machinery Corporation, San Jose, Calif., a corporation of Delaware No Drawing. Application April 21, 1937, Serial No. 138,167

7 Claims. (Cl. 99—168)

This invention relates to novel solutions for treating fruit for the purpose of killing or rendering dormant various fungi and spores which normally attack fruits and vegetables and cause decay. The invention is more particularly directed toward a treating solution containing available chlorine, the solution being stable and much more effective than solutions heretofore employed.

Heretofore, in preparing fresh fruits and vegetables for the market, solutions containing available chlorine have been employed such as, for example, solutions of the alkali hypochlorites, particularly sodium and calcium hypochlorite. Since solutions of sodium hypochlorite are normally unstable, attempts have been made to stabilize them by adding sodium hydroxide or sodium carbonate thereto. These solutions in actual operating use contain from about 0.3% to 1.5% of available chlorine, ordinarily a chlorine content of 0.6% being maintained in the operating tanks although the stock concentrated solutions contain 2% or 3% of available chlorine.

When such hypochlorite solutions are used in treating fruits and vegetables, the incoming fruit often carries spray residues thereon, which spray residues may be either acidic or alkaline in character. It has been found that the normal sodium hypochlorite solution used in destroying the fungi, spores thereof, molds, etc., will very quickly deteriorate and for some reason it becomes increasingly difficult to maintain a desired available chlorine content in the treating solution. For instance, in treating citrus fruits, solutions containing 0.6% of available chlorine are employed. Fruit is fed into these tanks and a certain quantity of the solution is continuously withdrawn from the tanks by adherence to the fruit. At the end of a week, it will be found that not only has the strength of the solution been reduced appreciably but furthermore excessively large quantities of a concentrated stock solution containing let us say 2% of available chlorine, have to be added in order to raise the chlorine content of the operating tank up to 0.6%. At the end of ten days or two weeks' operation, such excessively large quantities of stock solution need be added that it is more economical to dump the entire quantity of solution and start afresh. Toward the end of such run, the color and aroma of the solution undergo appreciable changes. Instead of the usual chlorine smell, the solution exhibits an acidic odor which is distinctly different from that of chlorine.

Furthermore, solutions which have been employed in the past are extremely alkaline, having a pH of about 11. These highly alkaline solutions often exert undesirable effects upon the skin or peel of the fruit and cause pitting. Furthermore, these prior solutions can not be warmed or heated to say 80°–90° F. since at such temperatures the chlorine is driven out very quickly.

Attempts have been made to stabilize the solutions by adding larger quantities of caustic such as sodium carbonate or sodium hydroxide but without success and moreover with deleterious effect upon the fruit.

The present invention is based upon the discovery that by the use of certain ingredients in the bath, a larger quantity of available chlorine is retained in the solution, the pH of the solution is reduced to below 9.5 and the entire treating operation becomes much more effective. Furthermore, it has been found that by the use of the ingredients of this invention the solution may be now heated to temperatures as high as 95° F. without substantial loss of chlorine and when used at such temperature a beneficial bleaching effect on scar tissue and dark, abraded or injured portions of the skin or peel of the fruit is obtained.

An object of this invention, therefore, is to disclose and provide an improved, stabilized aqueous solution, particularly adapted for use in preparing fresh fruits and vegetables for the market, such solution containing available chlorine.

Another object of the invention is to disclose and provide a stabilized aqueous solution of an alkaline hypochlorite, said solution being capable of retaining relatively high proportions of available chlorine for an appreciable length of time.

Another object of the invention is to disclose and provide a stabilized aqueous solution of an alkaline hypochlorite, said solution being capable of retaining relatively high proportions of available chlorine for an appreciable length of time, said solution being characterized by its stability and a pH of 9.5 or less.

A still further object of the invention is to disclose and provide a stabilized hypochlorite solution containing salts which dissociate feebly or weakly.

A further object is to disclose and provide a method of preparing fresh fruits and vegetables for the market by subjecting them to the action of a hypochlorite solution containing available chlorine, said solution being remarkably stable and substantially unaffected over prolonged periods of time by spray residues and other foreign matter introduced into the solution by the fruits or vegetables being treated, said solution being further characterized by the fact that its alkalinity is insufficient to injure the fruit or vegetables.

These and other objects, uses and advantages of the invention will become apparent to those skilled in the art from the following detailed description of the solution, its method of preparation and methods of use.

As stated hereinbefore, the various alkali hypochlorite solutions such as sodium hypochlorite, have been previously stabilized by the use of caustic and, theoretically at least, a higher quantity of free alkali should produce greater stability so that the available chlorine content is not quickly reduced. Caustic, such as sodium hydroxide, and most salts, such as sodium carbonate, are highly dissociated in solution and in this property are similar to strong acids such as hydrochloric. As a result, all of the alkali added to prior hypochlorite solutions existed in a virtually completely ionized condition. It has been found, however, that by using salts which have a slow ionization factor, so that a potential ionization exists in the solution, the stability of the hypochlorite solution can be remarkably increased and its effective life prolonged to two or three times the life of prior solutions. Moreover, the amount of available chlorine retained in the solutions is increased and heating of the solution does not cause the chlorine to be driven off as readily nor as completely. Typical salts having a low degree of ionization or dissociation adapted for the purposes of this invention are generally salts of a strong base and a weak acid such as, for example, sodium or potassium acetate, citrate, tartrate, etc., borax and the like. Borax has been found to be eminently suited since this salt when used in a hypochlorite solution and such solution is applied to fruits and vegetables, leaves a minor residue of borax on the treated fruit. Alkali hypochlorite solutions are most effective in killing the spores and molds generally identified by the workers in this art as "Blue Mold". Since the chlorine vaporizes, the action of the hypochlorite does not prevent reinoculation to any material extent. The small residue of borax which is left on the fruit, however, appears to be very effective not only in prolonging the decay-retarding effect and in making reinoculation more difficult, but in addition borax seems to exert a highly desirable effect upon the green molds and their spores, thereby reducing decay which may be caused by these types of decay organisms. In other words, although many salts are suited for use in the solution of this invention and effectively increase the life and stability of the hypochlorite solution, borax has the additional property of increasing the decay-retarding effect of the hypochlorite.

In one specific example of this invention, 100 gallons of a concentrated stock solution may be readily prepared by using 12 pounds of caustic soda (NaOH), 16 pounds of borax and 10 pounds of liquid chlorine, 100 gallons of water being used as the base. In making this stock solution the caustic soda and borax are preferably first dissolved in about 30 to 40 gallons of water, the heat of solution facilitating the solution of the borax. The remainder of the water is then added and the chlorine is then slowly added with agitation.

This concentrated stock solution will contain about 3½% of available chlorine. For ordinary practice, the solutions used in the operating tanks or applied to the fruits and vegetables need only contain from about 0.3% to 1.2% of available chlorine. In actual practice it has been found that a solution containing 0.6% of available chlorine is very effective in the treatment of highly susceptible fruits such as citrus fruits. When the proportions given in the illustrative example are used in making the treating solution containing 0.6% of available chlorine, said solution will also contain from about 1% to 2% of borax.

The solution described hereinabove may then be applied to the fruits or vegetables in any suitable manner as, for example, by spraying, dipping, immersion or the like. The time of contact may range from 2 to 7 minutes, 4 or 5 minutes being apparently an operating average. This solution will have a pH of between about 8 and 8.5 so that when fruits provided with oily or waxy peels are being treated, no injury to the fruit is caused by reason of the removal or saponification of peel oils and waxes. Furthermore, the operating solution of this invention need not be applied to the fruit at low temperatures such as 40° F.–65° F. but instead the solution may be heated to temperatures of 80° F.–95° F. without material loss of chlorine. When the treating solution is used at such temperatures, scar tissue and dark portions on relatively light fruit (such as the scar tissues often found on peels of citrus fruit) are effectively bleached.

The difference between the effect produced by the use of a salt which ionizes or dissociates but feebly and one which dissociates rapidly is readily appreciated by considering the fact that when 100 gallons of concentrated solution are made by the use of 12 pounds of NaOH, 6 pounds of sodium carbonate and 10 pounds of chlorine, the resulting solution will only contain 2%–2.5% of available chlorine. It is to be noted that when borax (or other weakly dissociatable salt) is used instead of sodium carbonate, the resulting solution will contain about 3.5% of available chlorine. The formation of this stronger solution is apparently due to the fact that although concentrated hypochlorite solutions are more unstable than dilute ones, the presence of borax or the like stabilizes the solutions very effectively and the escape of chlorine during mixing is reduced to a minimum.

Attention is called to the fact that in making up the solutions the amount of caustic or other alkali used for the purpose of forming a hypochlorite should not greatly exceed the amount which can theoretically combine with the chlorine. In other words, the finished operating solution should not contain more than about 0.1%–0.15% of free alkali since the presence of even 0.15% free alkali often causes injury to the fruits.

Suitable alkalinity for stabilization of the solution is preferably derived not from excess of caustic but instead from the salts of strong alkalies and weak acids which are added to or formed in the solution. As has been stated hereinabove, the amount of these salts so added should not increase the pH of the resulting solution to over about 9 or 9.5 and actually solutions having a pH of 8 to 8.5 are preferred. Moreover, instead of adding borax to the make-up tank, a small amount of excess caustic may be used and a proportionate amount of boric acid added. Similarly, various other weakly dissociatable salts may be formed in situ by the addition of citric acid, tartaric acid, etc.

Attention is also called to the fact that although sodium hypochlorites are more readily prepared and used than others, the invention is also applicable to other hypochlorites such as calcium, potassium, lithium, or other alkali-forming metals.

It is to be understood that the treating solutions of this invention may be applied to fruits and vegetables at any desired stage in the processing thereof. Ordinarily when this invention is applied to citrus fruit, the fruit is preliminarily washed and then treated with the hypochlorite solution. If desired, a minute film of wax or waxy material may then be applied to the fruit. In some instances the fruit may be subjected to a coloring operation whereby the varietal color of the fruit is enhanced.

I claim:

1. In a process of preparing fresh fruits and vegetables for the market, the steps of subjecting fruits and vegetables to the action of an alkaline solution comprising an aqueous medium containing an alkaline hypochlorite in amount sufficient to impart a content of from about 0.3% to 1.5% of available chlorine, and also containing a member of the group consisting of sodium and potassium acetate, citrate, tartarate, and borax, said solution having a pH of between about 7.5 and 9.5.

2. In a process of preparing fresh fruits and vegetables for the market, the steps of subjecting the fruits and vegetables to the action of an aqueous medium containing an alkali hypochlorite in an amount sufficient to impart a content of about 0.3% to 3.5% of chlorine in available form and also containing borax.

3. In a process of preparing fresh fruits and vegetables for the market, the steps of maintaining a body of alkaline treating solution comprising an aqueous medium containing an alkali hypochlorite in amount sufficient to impart a content of from about 0.3% to 1.5% of available chlorine, and from about 0.5% to 5% of borax, said solution having a pH of between about 7.5 and 9.5, and continuously advancing fruit in contact with said alkaline solution and withdrawing said fruit from contact with said solution whereby the fruit are immunized and decay thereof materially inhibited without injury to the fruit, said alkaline solution maintaining its effectiveness for a prolonged period of time.

4. In a process of treating fresh fruits and vegetables for the market, the steps of maintaining a body of alkaline treating solution comprising an aqueous medium containing an alkali hypochlorite in amount sufficient to impart a content of from about 0.3% to 1.5% of available chlorine, and from about 0.5% to 5% of a member of the group consisting of sodium or potassium acetate, citrate, tartrate, or borax, said solution having a pH of between about 7.5 and 9.5, and continuously advancing fruit in contact with said alkaline solution and withdrawing said fruit from contact with said solution whereby the fruit are immunized and decay thereof materially inhibited without injury to the fruit, said alkaline solution maintaining its effectiveness for a prolonged period of time.

5. In a process of preparing fresh fruits and vegetables for the market, the steps of maintaining a body of alkaline treating solution comprising an aqueous medium containing an alkali hypochlorite in amount sufficient to impart a content of from about 0.3% to 3.5% of available chlorine, and from about 0.5% to 5% of borax, and contacting the fruit with said alkaline solution and withdrawing the fruit from contact with said solution.

6. In a process of preparing fresh fruits and vegetables for the market, the steps of maintaining a body of alkaline treating solution comprising an aqueous medium containing an alkali hypochlorite in amount sufficient to impart a content of from about 0.3% to 3.5% of available chlorine and having from about 0.5% to 5% of a member of the group consisting of sodium and potassium acetate, citrate, tartrate, and borax, and contacting the fruit with said alkaline solution and withdrawing said fruit from contact with said solution said alkaline solution maintaining its effectiveness for a prolonged period of time.

7. In a process of preparing fresh fruits and vegetables for the market, the steps of maintaining a body of alkaline treating solution comprising an aqueous medium containing an alkali hypochlorite in an amount sufficient to impart a content of from about 0.3% to 3.5% of available chlorine and from about 0.5% to 5% of borax, said solution having an alkalinity less than corresponds to that of 0.15% free caustic alkali, and contacting the fruit with said alkaline solution and withdrawing the fruit from contact with said solution.

JAGAN N. SHARMA.